United States Patent [19]
Denny

[11] Patent Number: 5,937,766
[45] Date of Patent: Aug. 17, 1999

[54] ADJUSTABLE TOOL HOLDER FOR MOST ANY VEHICLE

[76] Inventor: Donald I. Denny, 2626 Loomis St., La Crosse, Wis. 54603

[21] Appl. No.: 08/934,359

[22] Filed: Sep. 19, 1997

[51] Int. Cl.$^6$ .................................................... A47B 23/00
[52] U.S. Cl. ............................. 108/44; 108/49; 108/143; 211/DIG. 1
[58] Field of Search ................................ 108/44, 45, 49, 108/137, 143, 147.19; 211/70.6, DIG. 1, 86.01, 175

[56] References Cited

U.S. PATENT DOCUMENTS

| | | |
|---|---|---|
| 1,788,267 | 1/1931 | Amaral . |
| 1,830,347 | 11/1931 | Camden et al. . |
| 1,888,736 | 11/1932 | Park . |
| 2,901,303 | 8/1959 | Anderson . |
| 2,922,684 | 1/1960 | Miller et al. . |
| 2,962,333 | 11/1960 | Policastro . |
| 3,476,256 | 11/1969 | Anderson . |
| 3,698,328 | 10/1972 | Weir ..................................... 108/49 X |
| 3,698,330 | 10/1972 | Krombach . |
| 3,774,773 | 11/1973 | Brent . |
| 3,776,387 | 12/1973 | Brent . |
| 3,813,714 | 6/1974 | Sater . |
| 4,286,525 | 9/1981 | Willmore .............................. 108/49 X |
| 4,371,138 | 2/1983 | Roberts ................................. 108/44 X |
| 4,418,626 | 12/1983 | Semien . |
| 4,601,226 | 7/1986 | McClintock ........................ 108/143 X |
| 4,702,382 | 10/1987 | Hoshino ............................... 211/86.01 |
| 4,811,875 | 3/1989 | DiSimone . |
| 4,915,437 | 4/1990 | Cherry . |
| 5,078,281 | 1/1992 | Johnson . |
| 5,080,230 | 1/1992 | Winnard . |
| 5,331,904 | 7/1994 | DiSimone et al. . |
| 5,443,019 | 8/1995 | Sheldrick . |
| 5,544,747 | 8/1996 | Horn .................................. 211/70.6 X |
| 5,666,888 | 9/1997 | Dame et al. ........................ 108/143 X |

Primary Examiner—Jose V. Chen
Assistant Examiner—Hanh V. Tran
Attorney, Agent, or Firm—Robert J. Harter

[57] ABSTRACT

A tool holder includes three degrees of adjustment to fit over the engine compartment of most any vehicle. The tool holder includes a tray rotatably attached to a telescoping arm which in turn is supported by two rotatable leg supports. The assembly is adapted to rest upon a vehicle's front fenders and straddle the engine compartment. In one embodiment of the invention, a tool holding magnet is used instead of the tray.

2 Claims, 3 Drawing Sheets

ADJUSTABLE TOOL HOLDER FOR MOST ANY VEHICLE

BACKGROUND OF THE INVENTION

1. Field of the Invention

The subject invention generally pertains to a tool tray for a vehicle, and more specifically, to one that straddles the engine compartment.

2. Description of Related Art

Some vehicle tool trays have limited degrees of adjustment. For example, the devices of U.S. Pat. Nos. 4,811,875 and 5,331,904 adjust to fit various widths of engine compartments and also adjust to accommodate various degrees of inclination of the fenders. However, the device fails to accommodate fenders that do not run parallel to each other.

At the opposite end of the spectrum, the device of U.S. Pat. No. 3,698,330 is so overly articulated that it would be difficult to set up, adjust, and stow.

SUMMARY OF THE INVENTION

To avoid the limitations and problems of existing tool trays, it is an utmost primary object of the invention to be able to grasp a tool tray between two hands and with one swoop motion adjust the tray to fit variable widths and out-of-parallelism of an engine compartment and simultaneously set the tool tray in place upon the fenders of a vehicle.

A second object of the invention it to provide a tool tray having three degrees of adjustment.

A third object is to provide a tool tray that is adjustable without the use of tools.

A fourth object is to use a magnetic tool holder to minimize obstructing the access to the engine.

A fifth object is to provide a tool holder that is readily stowed.

A sixth object is to provide a tool holder having a very minimum number of parts.

A seventh object is to provide a magnetic tool holder that when mounted on an incline prevents the tools from all sliding to the lowest point as can happen with a non-magnetic tray. The inclined situation can occur when one side and an opposite side of a vehicle is a front and back edge of an engine compartment (i.e., the magnet extends lengthwise from front to back of the engine compartment). In other cases, the vehicle itself can be jacked up to create the incline.

These and other objects of the invention are provided by a novel tool holder comprising a tool restrainer rotatably attached to a telescoping arm which in turn is supported by two rotatable leg supports to render the tool holder with three degrees of adjustment to fit over the engine compartment of most any vehicle.

BRIEF DESCRIPTION OF THE DRAWINGS

FIG. 1A is an enlarged perspective view of the encircled portion of FIG. 1.

DESCRIPTION OF THE PREFERRED EMBODIMENT

Figure 1:
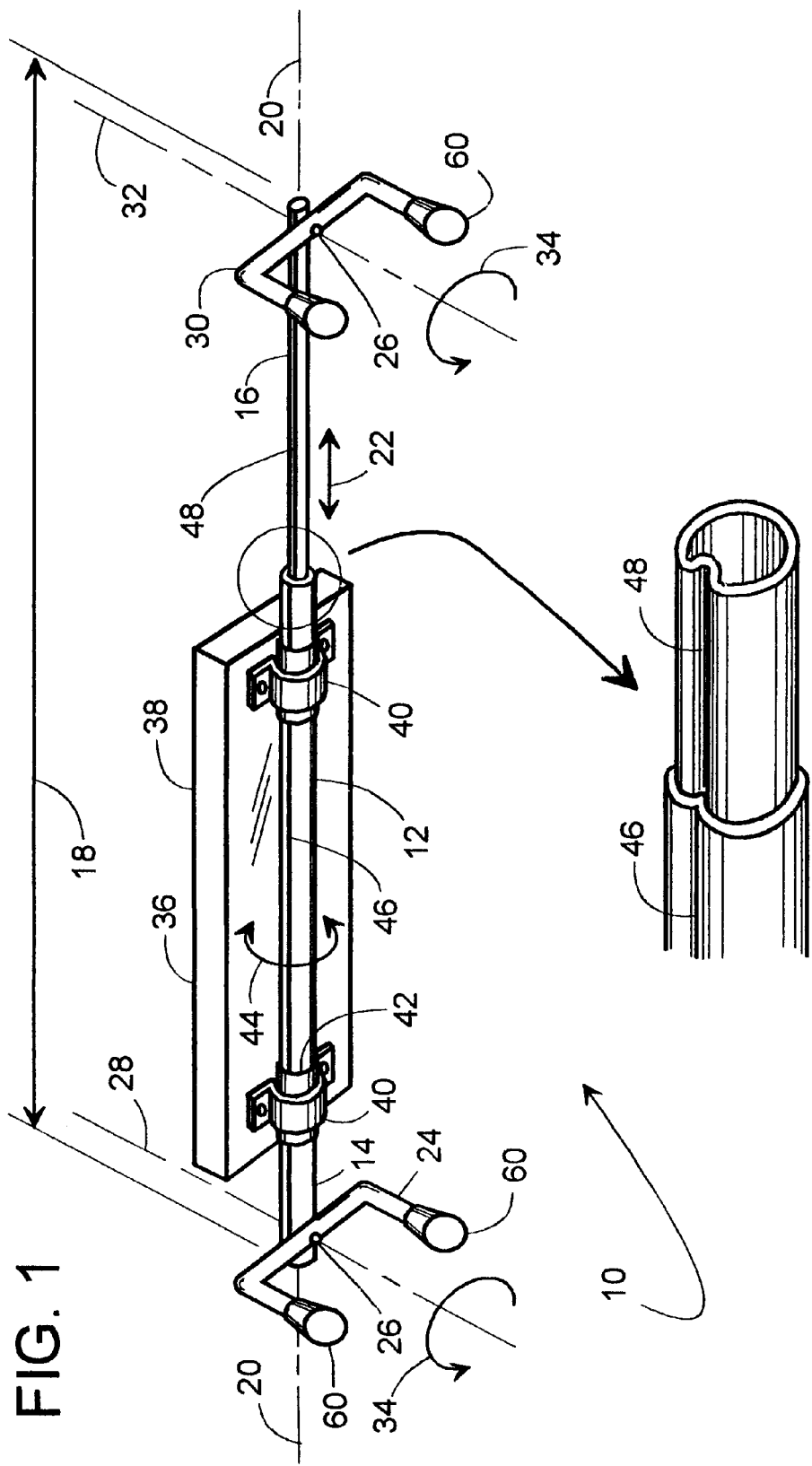
FIG. 1 is a perspective view of the invention.

A tool holder 10, of FIGS. 1 and 1A, includes a telescoping arm 12 comprising an outer tube 14 slidingly disposed about an inner tube 16 to provide arm 12 with an adjustable length 18 along a longitudinal centerline 20 of arm 12. This adjustment is referred to as a first degree of adjustment 22.

A first leg support 24 is rotatably attached to outer tube 14 by way of a bolt 26. Bolt 26 allows first leg support 24 to rotate relative to outer tube 14 about a first axis 28 that is generally perpendicular to centerline 20. A second leg support 30 is rotatably attached to inner tube 16 by way of another bolt 26. Bolt 26 allows second leg support 30 to rotate relative to inner tube 16 about a second axis 32 that is also generally perpendicular to centerline 20. Bolts 26 provide a second degree of adjustment 34 at each leg support 24 and 30.

A tool restrainer 36, such as a tool holding tray 38, is rotatably attached to arm 12 by way of brackets 40. A rubber sleeve 42 is pinched between arm 12 and bracket 40 to serve as a resilient gripper (Item 42) that prevents tray 38 from spinning freely about arm 12, yet allows rotational rotational adjustment provides a third degree of adjustment 44.

Tubes 14 and 16 each have a crease 46 and 48 respectively. Creases 46 and 48 engage each other to provide an anti-rotation lock that limits the relative rotation of tubes 14 and 16 and inhibits the twisting of arm 12 when tool holder 10 is installed.

Figure 2:
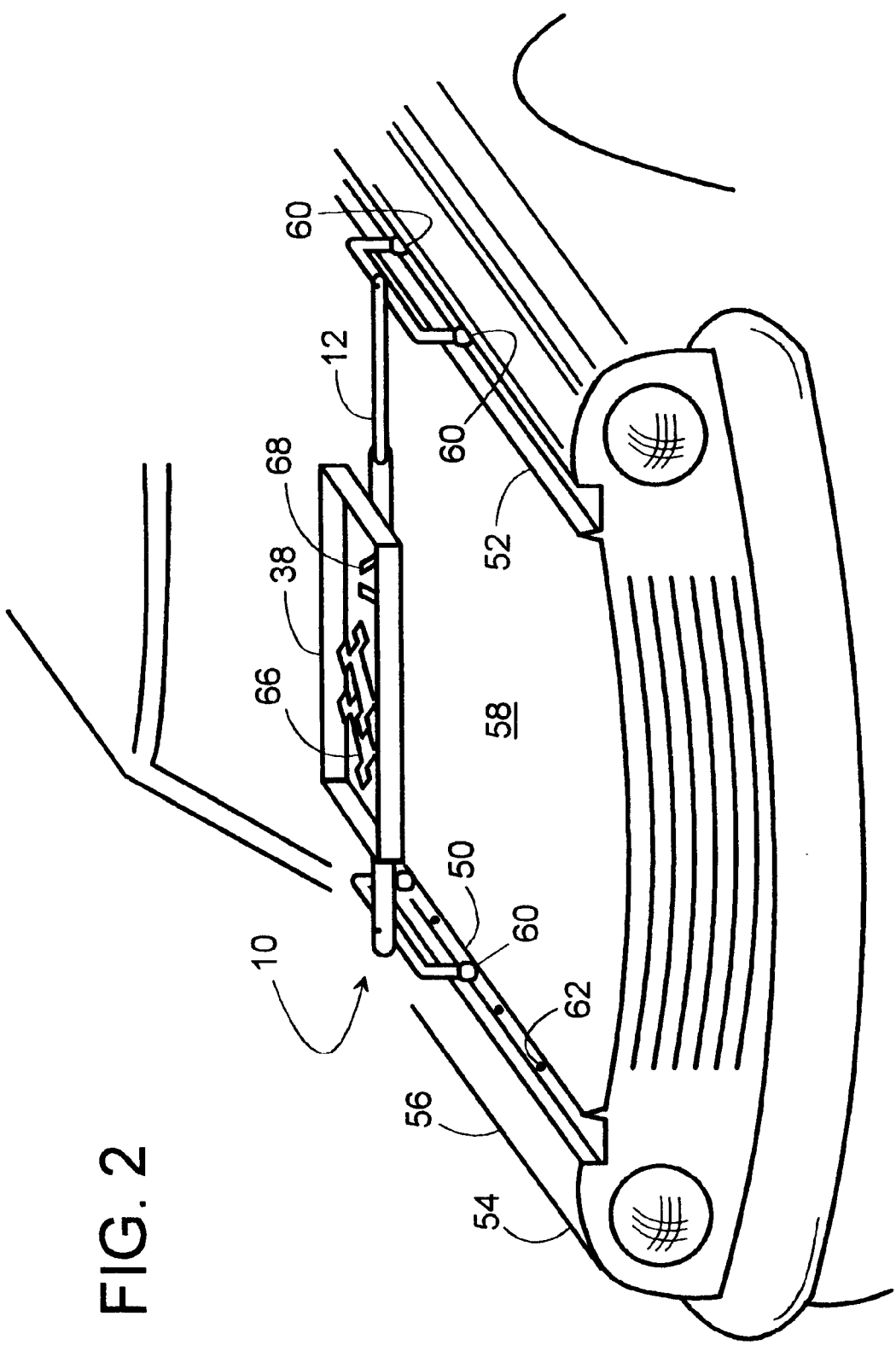
FIG. 2 is a perspective view of the invention set in place over the engine compartment of a vehicle.

When installed, tool holder 10 rests upon one side 50 and an opposite side 52 of a body 54 of a vehicle 56, as shown in FIG. 2. Tool holder 10 suspends tray 38 over an engine compartment 58 of vehicle 56. Spaced apart rubber pads 60 protect the painted surface of body 56 and inhibits leg supports 24 and 30 from sliding. Pads 60 are spaced apart to straddle protrusions 62 that may be on body 56.

Figure 3:
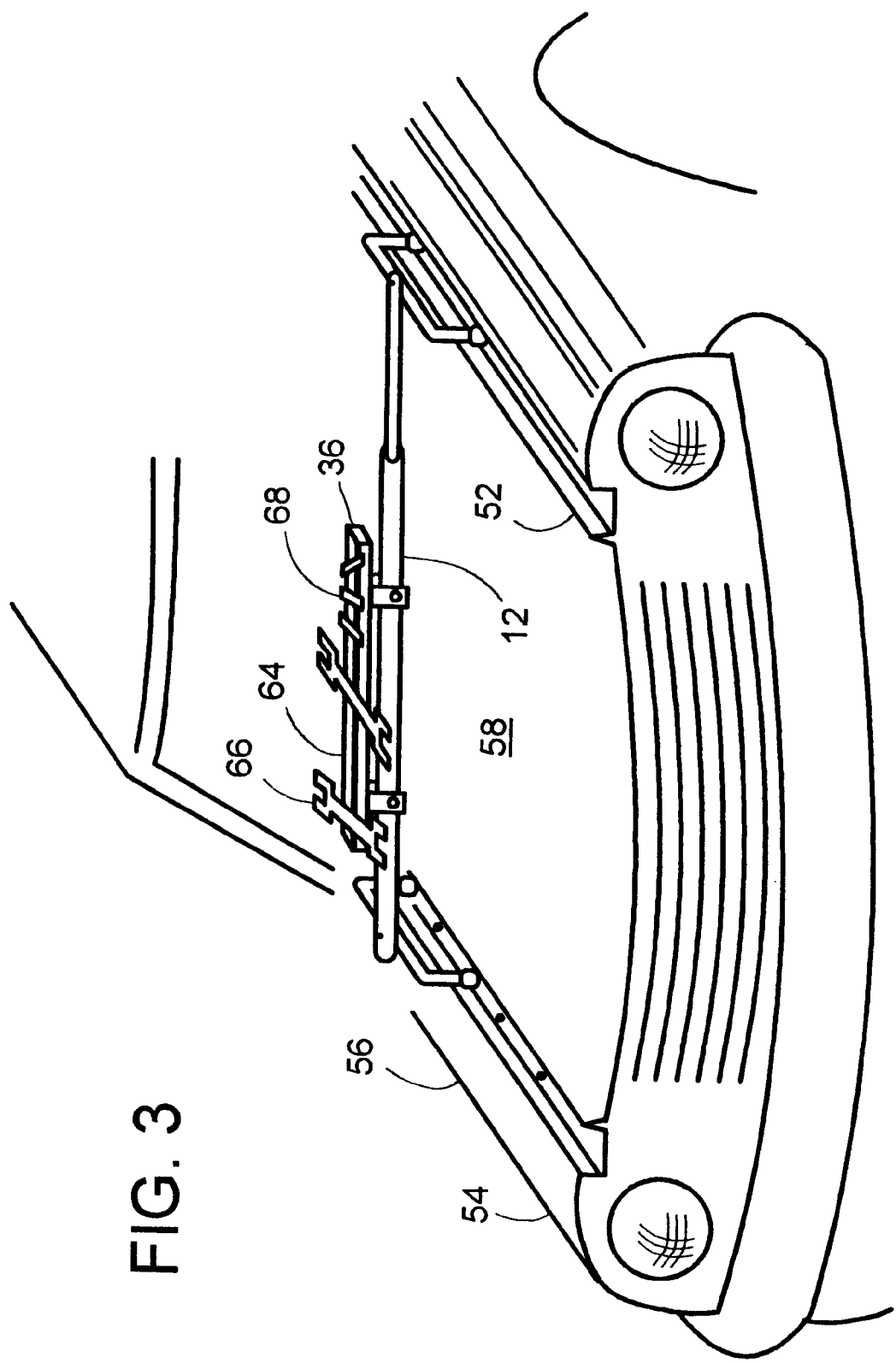
FIG. 3 is a perspective view of another embodiment of the invention.

Referring to FIG. 3, in another embodiment of the invention, tray 38 is replaced by a magnetic tool restrainer 64 (referred to hereinbelow as a "magnet") that is rigidly attached to arm 12. Magnet 64 is adapted to hold tools 66 and miscellaneous small parts such as nuts and bolts 68. It has been found that mounting magnet 36 spaced apart from arm 12 seems to enhance the magnetic force applied to tools 66 and items 68. In addition, magnet 36 spaced apart from arm 12 nearly doubles its tool storage capacity, because tools 66 can be stuck to both a top side 70 and an underside 72 of magnet 36.

Although the invention is described with respect to a preferred embodiment modifications thereto will be apparent to those skilled in the art. Therefore, the scope of the invention is to be determined by reference to the claims which follow.

I claim:

1. A tool holder adapted to rest upon one side and an opposite side of a body of a vehicle and extend over an engine compartment situated between said one side and said opposite side of said vehicle, said tool holder comprising:

a telescoping arm having a longitudinal centerline, said telescoping arm comprising an outer tube slidingly disposed about an inner tube to provide said telescoping arm with an adjustable length along said longitudinal centerline;

a first leg support rotatably attached to said outer tube, said first leg support being rotatable relative to said outer tube about a first axis that is substantially perpendicular to said longitudinal centerline;

two spaced apart pads attached to said first leg support, said two spaced apart pads being adapted to rest upon said one side of said body of said vehicle;

a second leg support rotatably attached to said inner tube, said second leg support being rotatable relative to said inner tube about a second axis that is substantially perpendicular to said longitudinal centerline;

two spaced apart pads attached to said second leg support, said two spaced apart pads being adapted to rest upon said opposite side of said body of said vehicle; and a magnet attached to said telescoping arm, said magnet being situated between said first leg and said second leg and suspended over said engine compartment when said tool holder is resting upon said one side and said opposite side of said body of said vehicle.

2. The tool holder of claim 1, wherein said magnet is spaced apart from said telescoping arm to hold said plurality of tools on both a top side and an underside of said magnet.

* * * * *